United States Patent [19]
Wu

[11] Patent Number: 5,211,459
[45] Date of Patent: May 18, 1993

[54] FORM FACTOR ADAPTOR

[75] Inventor: Jeff Wu, Mission Viejo, Calif.

[73] Assignee: Commerical & Industrial Design Co., Inc., Irvine, Calif.

[21] Appl. No.: 811,319

[22] Filed: Dec. 20, 1991

[51] Int. Cl.⁵ .......................................... A47B 77/08
[52] U.S. Cl. .............................. 312/223.2; 361/391; 248/27.1; 211/26
[58] Field of Search ............... 439/296, 377; 361/391; 364/708; 312/348.1-348.5, 223.2; 248/27.1; 211/120, 41, 26

[56] References Cited

U.S. PATENT DOCUMENTS

| | | | |
|---|---|---|---|
| 1,016,890 | 2/1912 | Meleney | 312/348.3 |
| 4,125,313 | 11/1978 | Sipp et al. | 439/651 |
| 4,293,179 | 10/1981 | Vonder | 439/637 |
| 4,572,604 | 2/1986 | Ammon et al. | 439/633 |
| 4,715,820 | 12/1987 | Andrews, Jr. et al. | 439/59 |
| 4,717,982 | 1/1988 | Toreson et al. | 360/137 |
| 4,754,397 | 1/1988 | Variya et al. | 364/200 |
| 4,932,885 | 6/1990 | Scholz | 439/79 |
| 4,941,841 | 7/1990 | Darden et al. | 369/75.1 |
| 4,959,026 | 9/1990 | Kreinberg | 439/651 |
| 4,964,017 | 10/1990 | Jindrick et al. | 361/390 |
| 5,043,963 | 8/1991 | Iwamoto | 369/36 |

FOREIGN PATENT DOCUMENTS 1274311 5/1972 United Kingdom .

OTHER PUBLICATIONS

Lian Li Industries Co., Ltd., brochure, Nov. 1991.
Connector Resources Unlimited, Inc. brochure, Nov. 1991.
Commercial & Industrial Design PC Accessory Products Catalog 1992.
Precision Connector, Inc. unreleased drawing, Jun. 1988.
Photographs A through L.

Primary Examiner—Gary F. Paumen
Attorney, Agent, or Firm—Knobbe, Martens, Olson & Bear

[57] ABSTRACT

A installation kit for installing a disk drive into a larger disk drive bay includes a form factor adaptor, an electrical connector and a DC cable. The form factor adaptor comprises a pair of side brackets which interengage with a front plate, forming an internal space. The disk drive inserts into the internal space and a clip is used to secure the disk drive in place. The clip interengages with the brackets, and, thus, no fasteners are required to secure the disk drive to the adaptor. The electrical connector is used to interconnect a pin header of the disk drive data port with a card edge receptacle positioned in the disk drive bay.

25 Claims, 10 Drawing Sheets

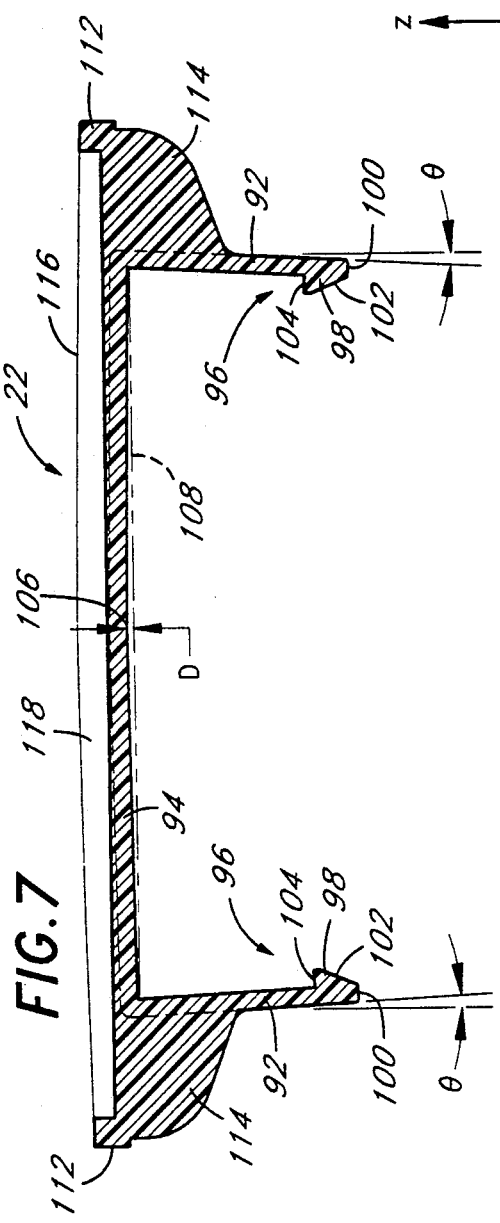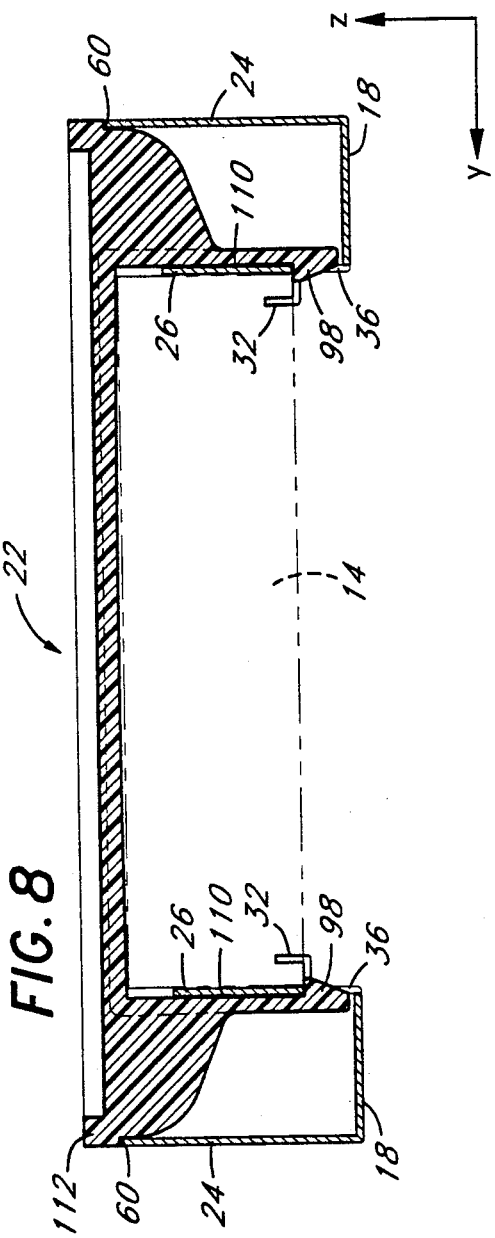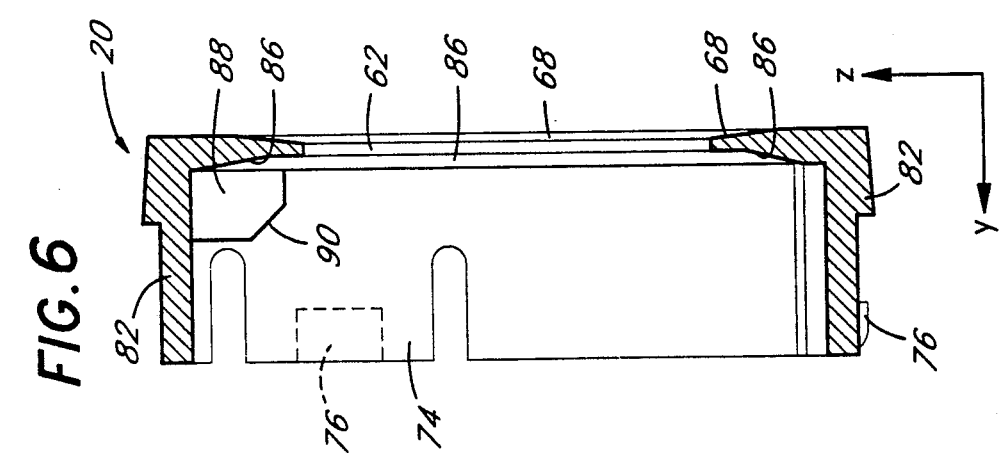

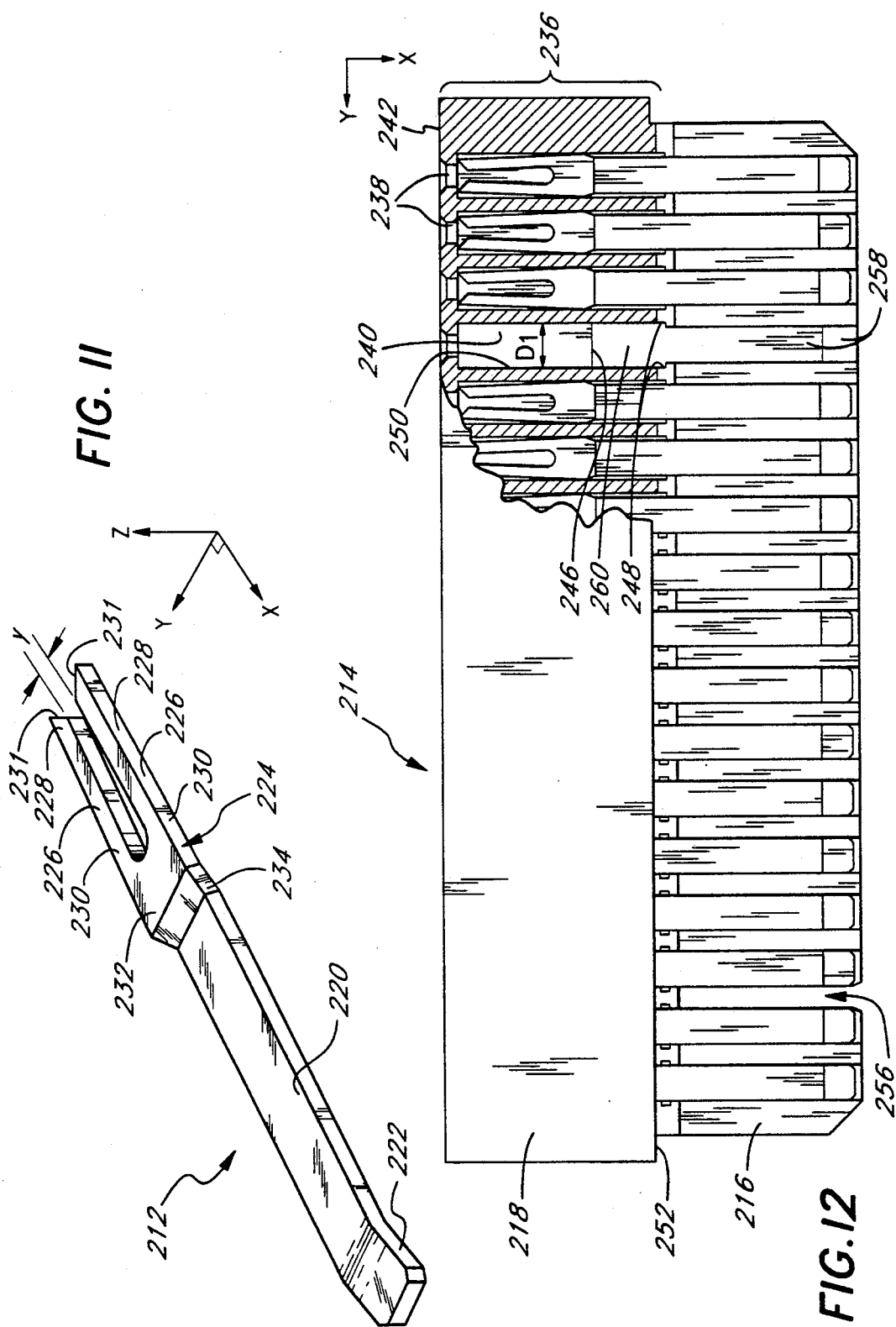

FORM FACTOR ADAPTOR

BACKGROUND OF THE INVENTION

1. Field of the Invention

The present invention relates to computer systems, and more particularly to mounting assemblies for computer components.

2. Description of Related Art

Personal computer systems commonly include a main enclosure housing a central processing unit and various other digital and analog electrical components including data storage devices. Data storage devices, such as, for example floppy disk drives, Winchester drives, tape drives and optical memory storage systems, typically conform to industry standards regarding height and width (i.e., "form factor"), and regarding the position of frame mounting holes.

As used herein, "form factor" refers to a width of an electrical component. When used in connection with a floppy disk drive, the form factor refers to industry standards regarding the width of the data storage unit according to the media size (i.e., the width of the floppy magnetic disk). For instance, when referring to a 5¼ inch form factor, which equals the width of the floppy disk, the disk drive has an overall width of about 150 millimeters (mm). When referring to a disk drive having a form factor of 3½ inch, the overall width of the disk drive equals about 100 mm.

Over the last decade, the size of personal computer components have drastically decreased in size while increasing in performance. For example, data storage devices introduced with personal computers in the early 1980's had a form factor of 5¼ inch and a height of 84 millimeters (mm) ("full height"). Currently, data storage devices commonly have a form factor of 3½ inch and a height of 25.4 mm ("one-inch height"), and a few companies have introduced even smaller data storage devices (e.g., a 2½ inch form factor).

These new data storage systems not only offer a smaller size, but also have larger memories and cost less than their predecessors. Because of the expanded memory capability and lower cost provided by the newer data storage devices, these devices typically replace antiquated data storage units. The smaller units, however, cannot be mounted directly into existing larger enclosure bays without supporting hardware.

A number of form factor conversion devices have been developed to retrofit a larger enclosure bay with a smaller, cheaper, increased memory capacity data storage device. Prior form factor conversion devices, however, use fasteners, such as screws, to secure the data storage unit to the frame of the form factor conversion device.

Fasteners pose many problems when assembling together the disk drive and the form factor conversion device. First, when producing the form factor conversion device, more effort is necessary to dimension, layout, and fabricate the extra mounting holes in the frame of the form factor conversion device. Second, shipping the additional parts adds expense and increases the possibility of omitting the small fasteners. Third, assembly is complicated due to the necessity of aligning and joining together the fasteners, the frame of the form factor conversion device and the data storage unit, thus increasing assembly time and labor costs. In addition, there is a greater likelihood of tolerance mismatch between the positions of the mounting holes in the disk drive and the mounting holes in the frame of the form factor conversion device, further frustrating the assembly process. The small fasteners also commonly get lost during the assembly process. These assembly difficulties increase the time associated with and the cost of assembling together the disk drive and the form factor conversion device.

SUMMARY OF THE INVENTION

The present form factor adaptor overcomes many disadvantages of the prior form factor conversion devices. In accordance with one aspect of the present invention, the form factor adaptor is used to retrofit an enclosure bay with a smaller electrical component (e.g., a data storage device). The form factor adaptor comprises a chassis to support the electrical component. The chassis includes a pair of rails spaced apart to receive the electrical component. The adaptor additionally comprises a clip having a pair of spring clasps which interengage with the chassis to secure the electrical component in place. Thus, the form factor adaptor uses no fasteners, but instead uses the interengagement of the spring clasps of the clip with the chassis to secure the disk drive to the frame of the form factor adaptor. Consequently, assembly time and labor costs are reduced over those associated with the prior form factor conversion devices.

In a preferred embodiment, the adaptor chassis comprises a pair of side brackets, and the clip comprises a pair of legs and a cross member. Each spring clasp of the clip is advantageously formed by one of the legs and a tang positioned at a bottom end of the leg. Desirably, the bottom end of each leg angles inwardly towards the opposing leg, preferably at an angle of 3° from the perpendicular. The chassis preferably comprises a face plate interconnecting with one set of ends of the brackets.

Each side bracket comprises an interior rail and an exterior rail. The brackets define a space between the interior rails sufficient to receive a data storage unit, and the brackets define a space between the exterior rails generally equal to the enclosure bay form factor. The brackets preferably include protuberances extending from the interior rails. The protuberances are configured to engage the electrical component and are positioned to index the electrical component with respect to the face plate.

In accordance with another aspect of the invention, an installation kit for installing an electrical component (e.g., a data storage device) into a larger enclosure bay is provided. The installation kit comprises a form factor adaptor having a chassis configured to support the electrical component and to connect with an enclosure bay structure. The installation kit also comprises a clip which interengages with the chassis to secure the electrical component to the chassis. The installation kit may also comprise an electrical connector for interconnecting a pin header to a card edge receptacle.

In a preferred embodiment, the chassis comprises a pair of brackets and a face plate which interconnects with the brackets. The face plate preferably defines an aperture configured to expose a front panel of the electrical component or to define a media opening.

In accordance with a preferred method of installing a data storage unit into a larger enclosure bay, the data storage unit is supported by a chassis. A clip is snapped to the chassis via interengaging structure and secures the data storage unit to the chassis. The chassis is mounted to an internal structure of the enclosure bay.

In a preferred installation method, a chassis having a pair of brackets and a front plate is provided. The front plate is snapped to the brackets to form an internal space configured to receive the data storage unit. The data storage unit is positioned and supported within the internal space. Advantageously, the data storage device is indexed with respect to the front plate when positioned within the internal space.

BRIEF DESCRIPTION OF THE DRAWINGS

These and other features of the invention will now be described with reference to drawings of preferred embodiments which are intended to illustrate and not to limit the invention, and in which:

FIG. 6 is a cross-sectional view of a face plate taken along line 6—6 of FIG. 3;

FIG. 7 is a cross-sectional view of a central clip of FIG. 2;

FIG. 8 is a cross-sectional view of the form factor adaptor taken along line 8—8 of FIG. 1;

FIG. 11 is a perspective view of a contact of the electrical connector of FIG. 10;

FIG. 12 is a partially cut-away top plan view of the electrical connector of FIG. 10 with a contact removed to illustrate the internal details of the housing;

DETAILED DESCRIPTION OF THE PREFERRED EMBODIMENT

Figure 1:
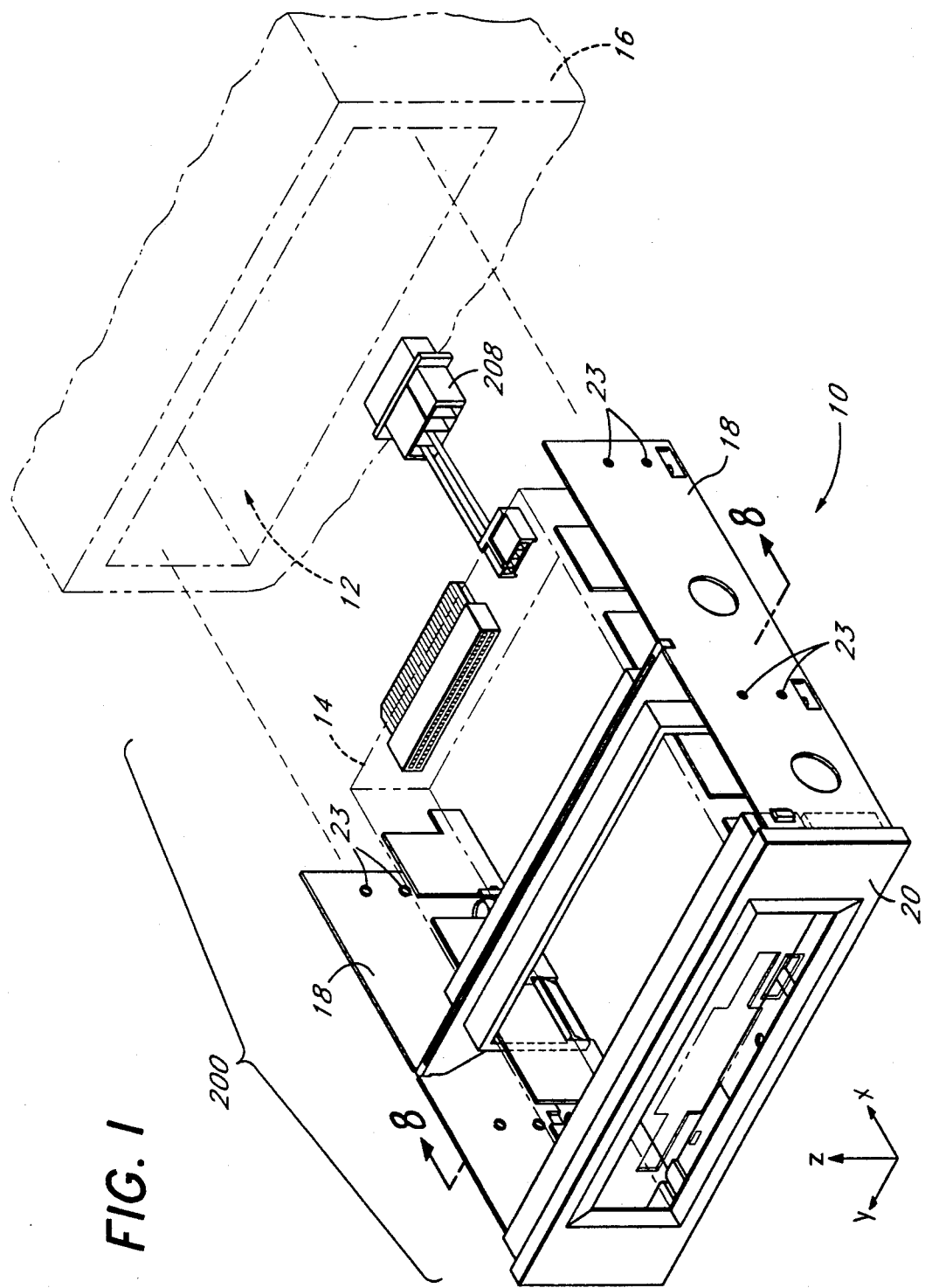
FIG. 1 is a perspective assembly view of an installation kit including a form factor adaptor in accordance with a preferred embodiment of the present invention.

FIG. 1 illustrates a form factor adaptor 10 in accordance with a preferred embodiment of the present invention used to retrofit a disk drive bay 12 (e.g., having a 5¼ inch form factor) with a smaller floppy disk drive 14 (e.g., having a 3½ inch form factor). The form factor adaptor 10 supports the floppy disk drive 14 (shown in phantom lines) and has exterior dimensions corresponding to the form factor of the larger disk drive bay 12 (shown in phantom lines). Accordingly, the form factor adaptor 10 snugly fits into the disk drive bay 12 and mounts to the existing internal chassis of the enclosure 16, thereby adapting the smaller disk drive 14 to the larger disk drive bay 12. The form factor adaptor 10 advantageously assembles and secures the disk drive 14 in place without the use of fasteners, such as, for example, machine screws, rivets or the like, thereby minimizing assembly time and labor costs.

Although the discussion of the present form factor adaptor 10 proceeds in connection with the installation of a standard floppy disk drive 14 into a larger disk drive bay 12, it is understood that those skilled in the art can readily adapt the present invention to retrofit any electrical component into a larger mounting bay.

The form factor adaptor 10 comprises a pair of side brackets 18 which snap together with a front plate 20. The disk drive 14 is inserted into a frame formed by the brackets 18 and the front plate 20, and is secured in place by a central clip 22. The central clip 22 spans across the disk drive 14, applying pressure on the edges of the disk drive 14, and snaps together with the brackets 18 on either side of the disk drive 14. The assembled unit (i.e., the disk drive 14 and the form factor adaptor 10) is then inserted into the disk drive bay 12 and is secured in place by conventional means, such as, for example, machine screws (threaded into mounting holes 23 in the side brackets 18), "rails" or a "sled." The individual elements of the form factor adaptor 10 will now be described in detail.

For the purpose of describing the present invention, a coordinate system is provided having coordinates oriented as follows: a "X-direction" coordinate parallel to longitudinal axes of the brackets 18; a "Y-direction" coordinate parallel to the face plate 20; and a "Z-direction" coordinate perpendicular to both the X-direction coordinate and the Y-direction coordinate. In addition, as used herein, "in the X-direction" means in a direction parallel to the X-direction coordinate, "in the Y-direction" means in a direction parallel to the Y-direction coordinate, and "in the Z-direction means in a direction parallel to the Z-direction coordinate.

Figure 2:
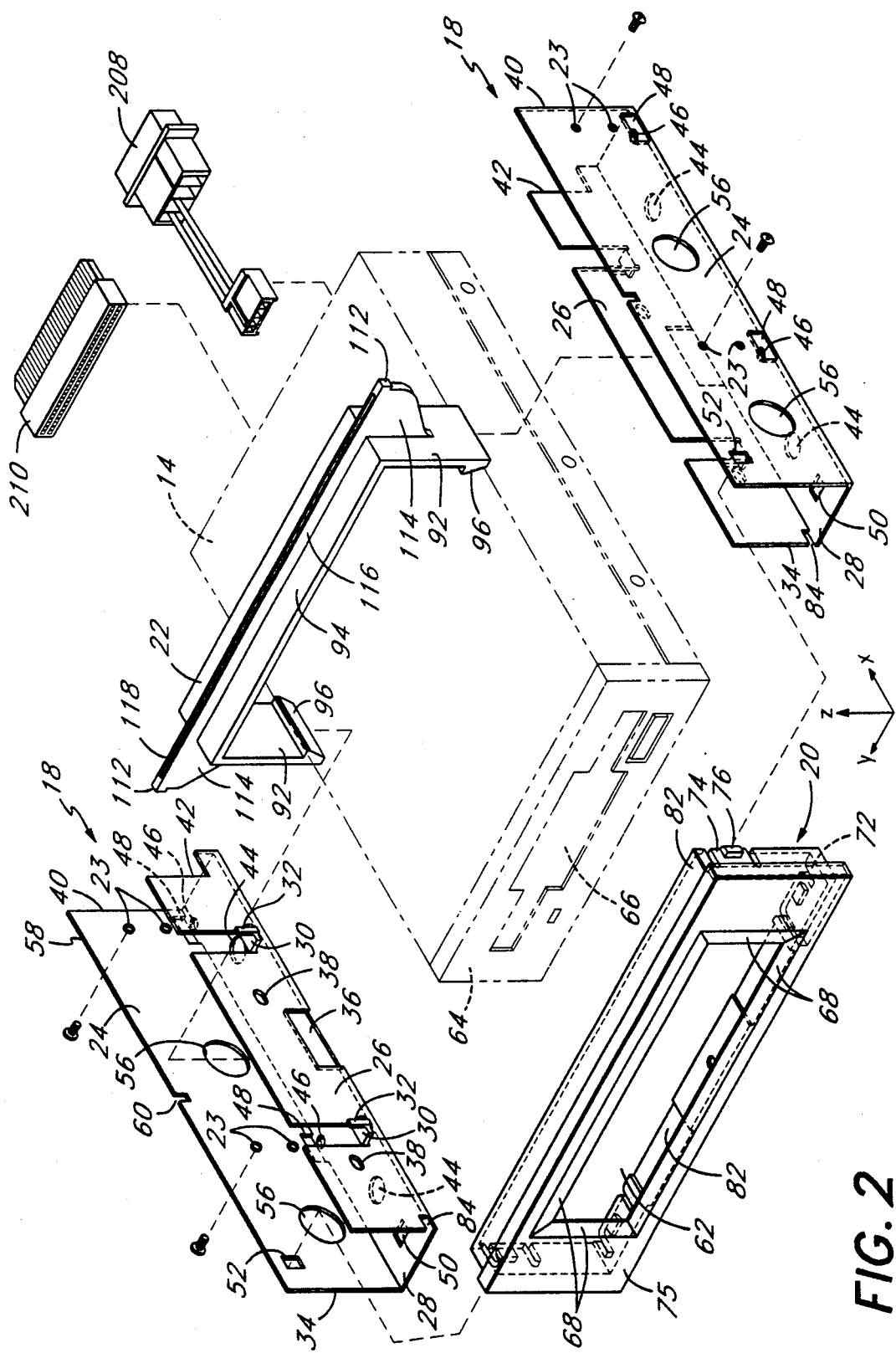
FIG. 2 is an exploded perspective view of the installation kit and the form factor adaptor of FIG. 1.

Referring to FIG. 2, each bracket 18 generally has a U-shaped cross section formed by an exterior rail 24, an interior rail 26 and a base plate 28. The pair of brackets 18 have similar but inverse shapes (i.e., are mirror images of each other), and are positioned parallel to each other with the interior rails 26 of each bracket 18 opposing each other. The structure of the interior rails 26, bases 28 and exterior rails 24 for each bracket 18 are similar, and the discussion herein of these components is understood as applying equally to both brackets 18, unless specified to the contrary.

The interior rail 26 generally has a rectangular plate shape and supports a pair of tabs 30 which extend perpendicular to the interior rail 26 in the Y-direction. At the end of each tab 30, a protuberance 32, such as a post, extends in the Z-direction. The posts 32 engage standard mounting holes in the bottom of the disk drive 14 when assembled. The posts 32 are precisely positioned from a forward end 34 of the bracket 18 for indexing purposes, as discussed in detail below. Each interior rail 26 defines a rectangular-shaped aperture 36 proximate to the base plate 28 which receives a portion of the central clip 22 when assembled. The interior rails 26 additionally define a pair of screw holes 38 provided for mounting redundancy purposes, also discussed below. At its rear end 40, the interior rail includes a relief 42 which can receive a portion of an electrical connector, such as, for example, a card edge receptacle, extending beyond the side edge of the disk drive 14.

The base plate 28 has a generally rectangular shape and defines a pair of holes 44 sized and positioned to industry standards for mounting in a conventional disk drive bay 14. The base plate additionally includes a pair of threaded mounting holes 46 precisely positioned from the forward end 34 of the bracket 18 which can receive mounting screws to secure the bracket 18 to the existing enclosure chassis. Adjacent to each mounting hole 46, the exterior rail 24 includes a relief 48 for manufacturing purposes, as known in the art. The base plate 28 also includes a spring tang aperture 50 proximate to the bracket forward end 34.

The exterior rail 24 also has a rectangular plate configuration. The exterior rail 24 defines a spring tang aperture 52 proximate to the bracket forward end 34 which receives a leaf spring tang 54 of the face plate 20 when assembled. The exterior rail 24 also defines a pair of holes 56 axially aligned in the Y-direction with the screw holes 38 of the interior rail 26. The holes 56 have a sufficient size to receive a fastener and an installation tool tip such that the fastener can be installed from the outer side of the exterior rail 24. The exterior rail 24 further defines four threaded mounting holes 23 precisely positioned from the forward end 34 of the bracket 18 and from the base plate 28 according to industry standards. An upper edge 58 of the exterior rail 24 defines a notch 60 positioned approximately at the longitudinal midpoint of the bracket 18 and positioned symmetrically about a midpoint of the interior rail aperture 36 (measured in the X-direction).

Referring to FIG. 1, the spacing between the interior rails 26 is generally equal to the form factor of the disk drive 14, and the distance between the exterior rails 24 of the brackets 18 generally equals the form factor of the disk drive bay 12. The base plates 28 of the brackets 18 have a width measured in the Y-direction approximately equal to one-half of the difference between the form factor of the disk drive bay 12 and the form factor of the disk drive 14 in order to position the interior rails 26 and the exterior rails 24 accordingly.

The exterior rails 24 have a height (measured in the Z-direction) generally equal to the height of the existing disk drive bay 12 (commonly a ½-height), and the interior rails 26 have a height significantly smaller than the height of the exterior rails 24. The tabs 30 extending from the interior rail 26 are preferably positioned at a height from the base plate 28 such that a disk drive 14 setting on the tabs 30 is generally centered with respect to the height dimension of the exterior rails 24. The interior rail 26 extends in the Z-direction beyond the tabs 30 for a distance less than the height of the disk drive 14. In a preferred embodiment used with a one-inch height disk drive 14, the interior rails 26 extend beyond the tabs 30 for a distance equal to 19 mm.

The brackets 18 are stamped out of and formed from steel sheets, and tapped by processes known in the art. The brackets are subsequently deburred, cleaned and coated with a zinc finish to prevent rusting of the components.

Referring to FIG. 2, the face plate 20 has a generally rectangular shape, coextensive with the frontal opening of the disk drive bay 12. The face plate is preferably injection molded out of a fire-retardant material approved by the Underwriter's Laboratories ("UL approved"), such as, for example, Acrylonitrile Butadiene Styrene, and thus is integrally formed.

The face plate 20 defines a central aperture 62 sized and positioned to frame the front plate 64 of the disk drive 14 when assembled to expose the shutter door 66 of the disk drive 14. The face plate 20 desirably includes beveled edges 68 circumscribing the central aperture 62 which form a frame-like ("bezel") appearance.

Figure 3:
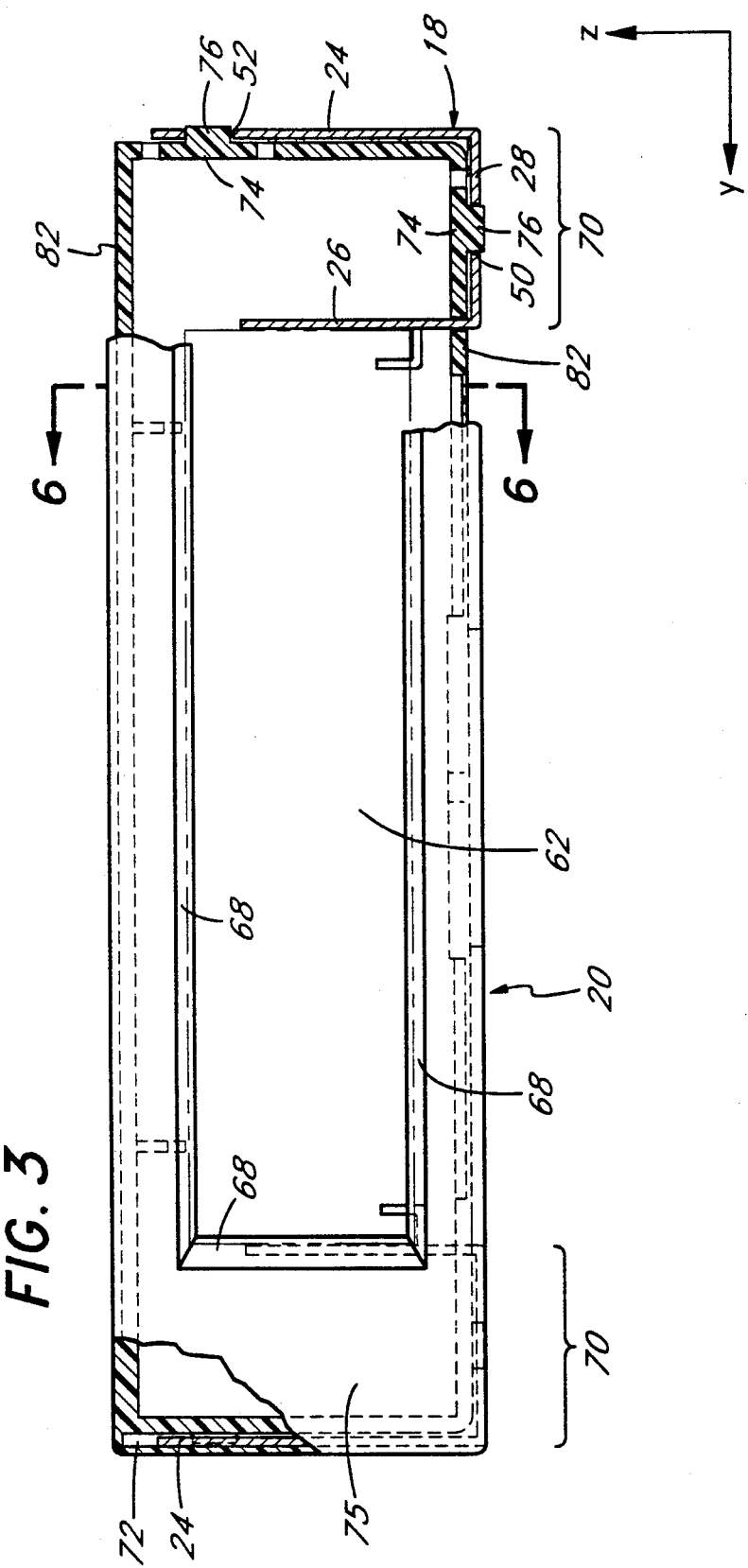
FIG. 3 is a partially cut-away front elevational view of the form factor adaptor of FIG. 1.

Referring to FIG. 3, the face plate 20 includes a pair of bracket receptacles 70, one bracket receptacle 70 positioned on one side of the central aperture 62 and the other bracket receptacle 70 positioned on the other side of the central aperture 62. Each bracket receptacle 70 comprises an exterior rail channel 72 which receives the forward end 34 of the bracket exterior rail 24 in assembly. The bracket receptacles 70 additionally include a pair of leaf spring tabs 74 positioned to engage the spring tab apertures 50, 52 defined by the base plate 28 and the exterior rail 24 of the bracket 18, respectively. The precise position of the leaf spring tabs 74 with respect to a front surface 75 of the face plate 20 precisely indexes the bracket forward end 34 to face plate front surface 75. Consequently, the bracket posts 32 and the bracket mounting holes 23, 46 are precisely positioned from the face plate front surface 75 (i.e., from the "zero-point") accordingly to industry standards.

Figure 4:
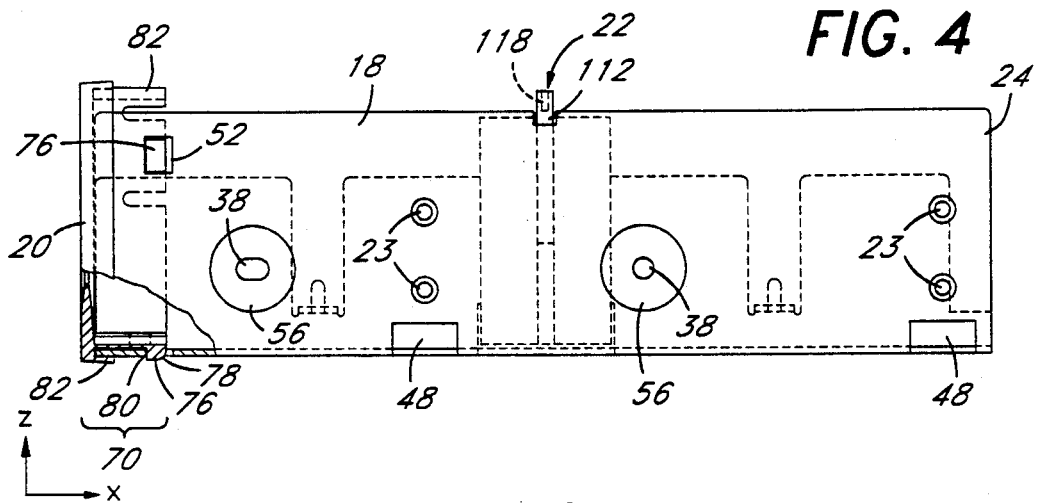
FIG. 4 is a partially cut-away side elevational view of the form factor adaptor of FIG. 1.
Figure 5:
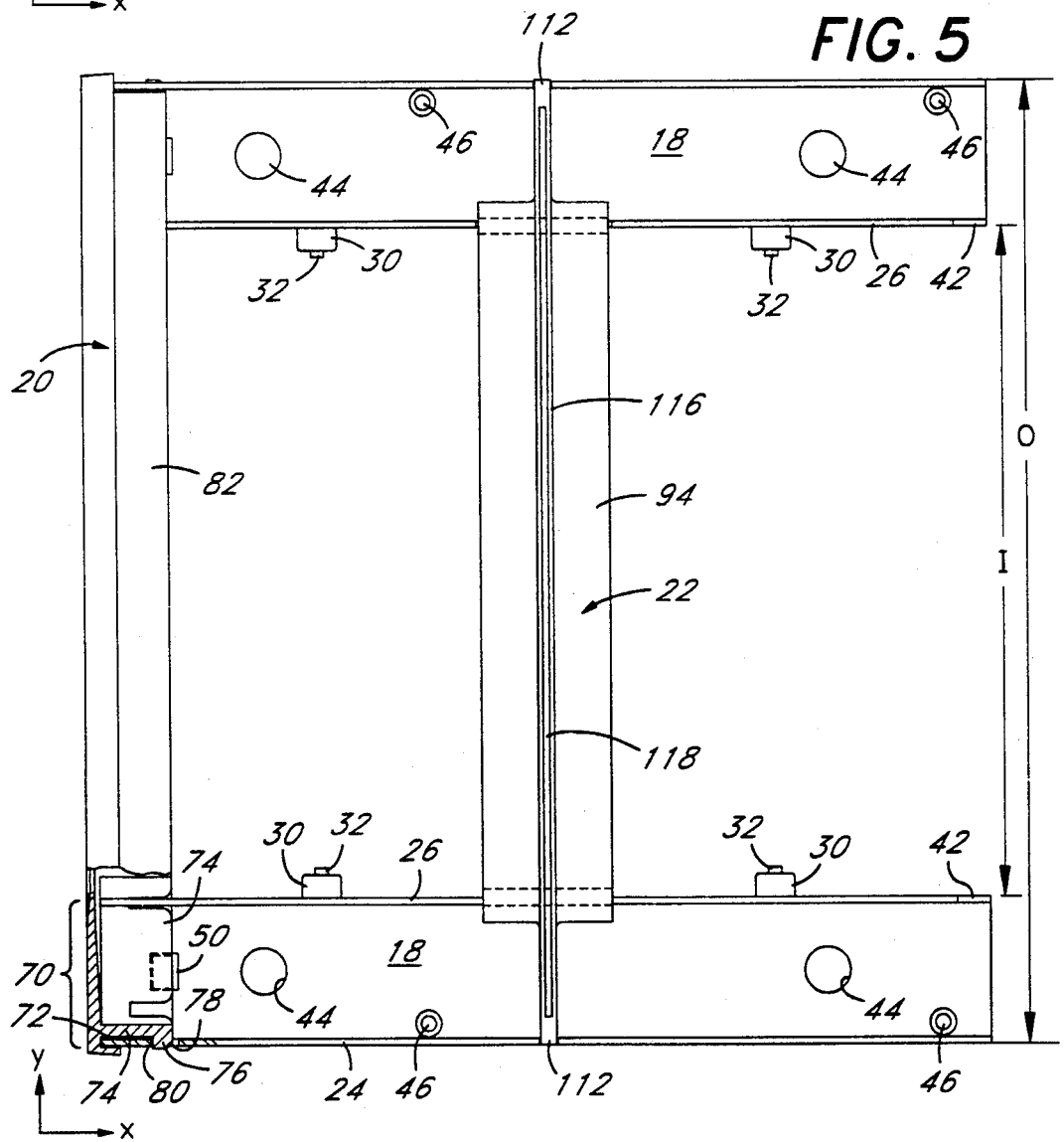
FIG. 5 is a partially cut-away plan view of the form factor adaptor of FIG. 1.

Each leaf spring tab 74 include a tang 76 extending in a direction generally perpendicular to the leaf spring tab 74 which snaps into the spring tab apertures 50, 52. As best seen in FIGS. 4 and 5, each tang 76 comprises a chamfered surface 78 and abutment surface 80; the abutment surface engages an edge of the spring tab aperture 50, 52 with the leaf spring tab 74 biasing the tang 76 into the spring tab aperture 50, 52. This interengagement between the face plate 20 and bracket 18 prevents the bracket 18 from unintentionally disengaging from the face plate 20.

Referring to FIGS. 4 and 5, the face plate 20 additionally includes a pair of cross members 82 which provide structural stability to the front plate to resist bending of the face plate 20 about an axis parallel to the Z-direction coordinate As best seen in FIG. 3, the bottom cross member 82 (i.e., the cross member 82 closest to the base plate 28) inserts into a slot 84 defined by the bracket interior rail 26 when the face plate 20 attaches to the bracket 18.

As illustrated in FIG. 6, the face plate 20 includes a beveled rear surface 86, tapering towards the central aperture 62. The face plate 20 additionally includes a pair of guide tabs 88 extending from the upper cross member 82 (i.e., the cross member 82 farthest away from the base plate 28 when assembled) towards the central aperture 62. Each guide tab 88 includes a chamfer edge 90 which facilitates insertion of the disk drive front plate 64 into the face plate 20. When assembled with the disk drive 14, the guide tabs 88 bias the forward end of the disk drive 14 towards the base plate 28 to insure proper positioning of the disk drive 14 within the form factor adaptor 10.

Referring to FIG. 7, the central clip 22 has a broad U-shape defined by a pair of legs 92 and a cross member 94 positioned generally perpendicularly to the legs 92. The central clip 22 includes a pair of spring clasps 96 formed by the legs 92 and by a pair of tangs 98 positioned at a bottom end 100 of the legs 92. The legs 92 desirably angle inwardly towards each other by an angle measured from a perpendicular axis parallel to the Z-direction coordinate. In a preferred embodiment, the angle θ is approximately 3°. This oblique positioning of the legs 92 with respect to the perpendicular axis biases the tangs 98 towards the center of the central clip 22 when assembled with the brackets 18, as discussed in detail below. Each tang 98 includes a chamfer surface 102 to facilitate insertion of the tang 98 into the interior rail aperture 36 and an abutment surface 104 to prevent disengagement of the central clip 22 from the bracket 18.

The cross member 94 advantageously has a slight convex shape extending away from the legs 92. An apex 106 of the arcuate cross member 94 is preferably positioned at a midpoint of the cross member 94, as measured in the Y-direction, and is distanced from a horizontal line 108 (parallel to the Y-axis and extending between the top ends of the legs 92) by a distance D. In a preferred embodiment, the distance D is about 1.0 mm.

As illustrated in FIG. 8, the cross member 94 spans between the legs 92 and has a length measured in the Y-direction equal to the distance between the outer surfaces 110 of the bracket interior rails 26. The cross member 94 and the legs 92 preferably have substantially equal widths (measured in the X-direction) which are sufficiently sized to hold the disk drive 14 on the bracket tabs 30. The width of the cross member 94 and the legs 92 desirably equals the width of the channel formed between the interior rail 26 and the exterior rail 24 of the bracket 18. As a result, the central clip 22 can be placed within one of the brackets 18 when packaging the components of the form factor adaptor 10, thus reducing the volume of the packaged components and reducing shipping costs. In a preferred embodiment of the form factor adaptor 10 used with a 3½ inch form factor disk drive 14 and the 5¼ inch form factor disk drive bay 12, the width of the cross member 94 and the legs 92 is approximately 20 mm.

As illustrated in FIG. 7, the central clip 22 additionally comprises pair of support tabs 112 supported by a pair of braces 114 and a central rib 116. Each support tab 112 is positioned at the longitudinal ends of the central clip 22 and is sized to fit into the exterior rail notches 60. The central rib 116 extends between the support tabs 112 and gives the central clip 22 structural stability to resist bending about an axis parallel to the X-direction coordinate. In a preferred embodiment, as best seen in FIG. 5, the central rib 116 includes a channel 118 to reduce the amount of material forming the central rib 116 without significantly reducing the strength of the central rib 116, as known in the art.

The braces 114 interconnect the legs 92 and the central rib 116 and act as struts, thereby improving the structural strength of the central clip 22. The braces 114, central rib 116 and the support tabs 112 have a width measured in the X-direction significantly smaller than the width of the legs 92 and cross member 94. In a preferred embodiment of the form factor adaptor 10 used with a 3½ inch form factor disk drive 14 and the 5¼ inch form factor disk drive bay 12, the width of the braces 114, central rib 116 and support tabs 112 equals 2.5 mm.

The central clip 22 is preferably injection molded using a UL approved fire-retardant thermal plastic, such as, for example, Acrylonitrile Butadiene Styrene (ABS), and is thus integrally formed. The integral structure of the central clip 22 allows elastic deformation of the central clip 22 during assembly without over stressing the junctions of the central clip components.

FIGS. 1, 3-5 and 8 illustrate, in whole or in part, the assembled form factor adaptor 10. Referring to FIG. 1, the brackets 18 snap into the bracket receptacles 70 of the face plate 20. The brackets 18 are positioned such that the exterior rail 24 of each bracket 18 is positioned proximate to an end of the face plate 20 and the interior rail 26 of each bracket 18 is positioned adjacent to the central aperture 62 of the face plate 20.

When assembling the brackets 18 and face plate 20, each bracket 18 is slid into its respective bracket receptacle 70. The bracket forward end 34 engages the tang chamfer edges 78 of the spring tabs 74 which causes the spring tabs 74 to deflect as the bracket 18 slides into the bracket receptacle 70. When the bracket 18 is fully inserted, the spring tabs 74 spring back to a generally undeflected position with the tangs 76 snapping into the spring tab apertures 50, 52 of the bracket 18. The abutment surfaces 80 of the tangs 76 prevent the bracket 18 from sliding out of the bracket receptacle 70 with the spring tabs 74 biasing the tangs 76 into the spring tab apertures 50, 52.

The structure of the face plate 20 defining the bracket channel 72 secures the forward end 34 of the bracket exterior rail 24 thereby preventing movement of the forward end 34 of the bracket 18 in the Y-direction. The combination of the spring tabs 74 and the structure defining the bracket channel 72 attaches the bracket 18 to the face plate 20.

As illustrated in FIG. 5, the face plate 20 and the brackets 18 form a generally rectangular frame having an outer dimension 0 (measured in the Y-direction) defined by the exterior rails 24 which generally equals the form factor of the disk drive bay 12. The resulting frame configuration also defines an inner dimension I (measured in the Y-direction) defined between the interior rails 26 which generally equals the form factor of the disk drive 14.

Referring to FIG. 1, the disk drive 14 is inserted between the brackets 18 with the side surfaces of the disk drive 14 juxtaposing the interior rails 26. The posts 32 of the interior rail tabs 30 insert into standard mounting holes positioned in the bottom surface of the disk drive 14, thereby preventing the disk drive 14 from moving in X-direction. Because of the precise positioning of the posts 32 with respect to the bracket forward ends 34 and because of the precise positioning of the forward ends 34 with respect to the front surface 75 of the face plate 20, the engagement of the posts 32 with the disk drive mounting holes index the disk drive 14 with respect to the front surface 75 of the face plate 20. The interior rail tabs 30 support the disk drive 14 with the posts 32 engaging the mounting holes of the disk drive 14.

With the disk drive 14 properly positioned on the interior rail tabs 30, the front plate 64 of the disk drive 14 abuts the rear surface 86 of the face plate 20. The beveled configuration of the face plate rear surface 86 tends to center the disk drive front plate 64 with respect to the central aperture 62. Consequently, this structure accounts for minor dimensional differences in the disk drive front plates 64 produced by different disk drive manufacturers. In addition, the guide tabs 88 bias the front end of the disk drive 14 towards the base plate 28 to insure that the disk drive 14 is sitting directly on the interior rail tabs 30 and to prevent the occurrence of unsightly gaps forming between the adaptor face plate 20 and the disk drive front plate 64.

Once the disk drive 14 is positioned between the brackets 18 and is sitting on the interior rail tabs 30 with the posts 32 projecting into the bottom mounting holes of the disk drive 14, the central clip 22 interengages with the brackets 18 and secures the disk drive 14 in place. That is, the center clip 22 is pressed over the interior rails 26 to elastically deflect to the spring clasps 96 of the central clip 22 outwardly. The chamfer edges 102 of the tangs 98 ease this process. The tangs 98 of the spring clasps 96 snap into the interior rail apertures 36, thereby interengaging the central clip 22 with the brackets 18. When assembled with the brackets 18, the central clip legs 92 juxtapose the outer surfaces 110 of interior rails 26 and generally align with a perpendicular axis parallel to the Z-direction coordinate. Because of the oblique undeflected positioning of the legs 92 relative to the perpendicular axis, the legs 92 of the central clip 22 bias the tangs 98 into the interior rail apertures 36. The abutment surfaces 104 of the tangs 98 prevent the tangs 98 from slipping out of the interior rail apertures 36.

Referring to FIG. 8, the central clip 22 has a configuration designed to create an interference between the cross member 94 and the disk drive 14 proximate to the central clip legs 92 without putting significant pressure on the center of the disk drive 14. The central clip legs 92 have a dimension, measured between the abutment surface 104 and the cross member 94, slightly less than the height (measured in the Z-direction) of the disk drive 14. Thus, the cross member 94 clamps down on the edges of the disk drive 14 positioned proximate to the central clip legs 92. However, as illustrated in FIG. 8, the convex shape of the cross member 94 prevents significant contact between the cross member 94 and the disk drive 14, except at the extreme edges of the disk drive 14, as described above.

With the central clip tangs 98 interengaging the internal rail apertures 36, the support tabs 112 of the central clip 22 insert into the notches 60 of the exterior rail upper edge 58. The interengagement between the exterior rail 24 and the central clip 22 further secures the central clip 22 in place and provides the central clip 22 with stability in the X-direction.

As indicated by the above description of the assembly, assemblage is quick and easy. All of the components snap together. The form factor adaptor 10 uses no fasteners, but instead relies on the interengagement of the components, using leaf spring with tangs snapping into corresponding apertures. Thus, the form factor adaptor 10 overcomes all of the above disadvantages associated with the prior form factor conversion devices, and reduces material and labor costs.

In addition, the form factor adaptor 10 includes convention mounting holes 38 in the interior rails 26 to provide redundancy in securing the disk drive 14 to the form factor adaptor 10 if desired; however, the combination of the central clip 22 and the interior rail posts 32 adequately secure the disk drive 14 in place.

Figure 9:
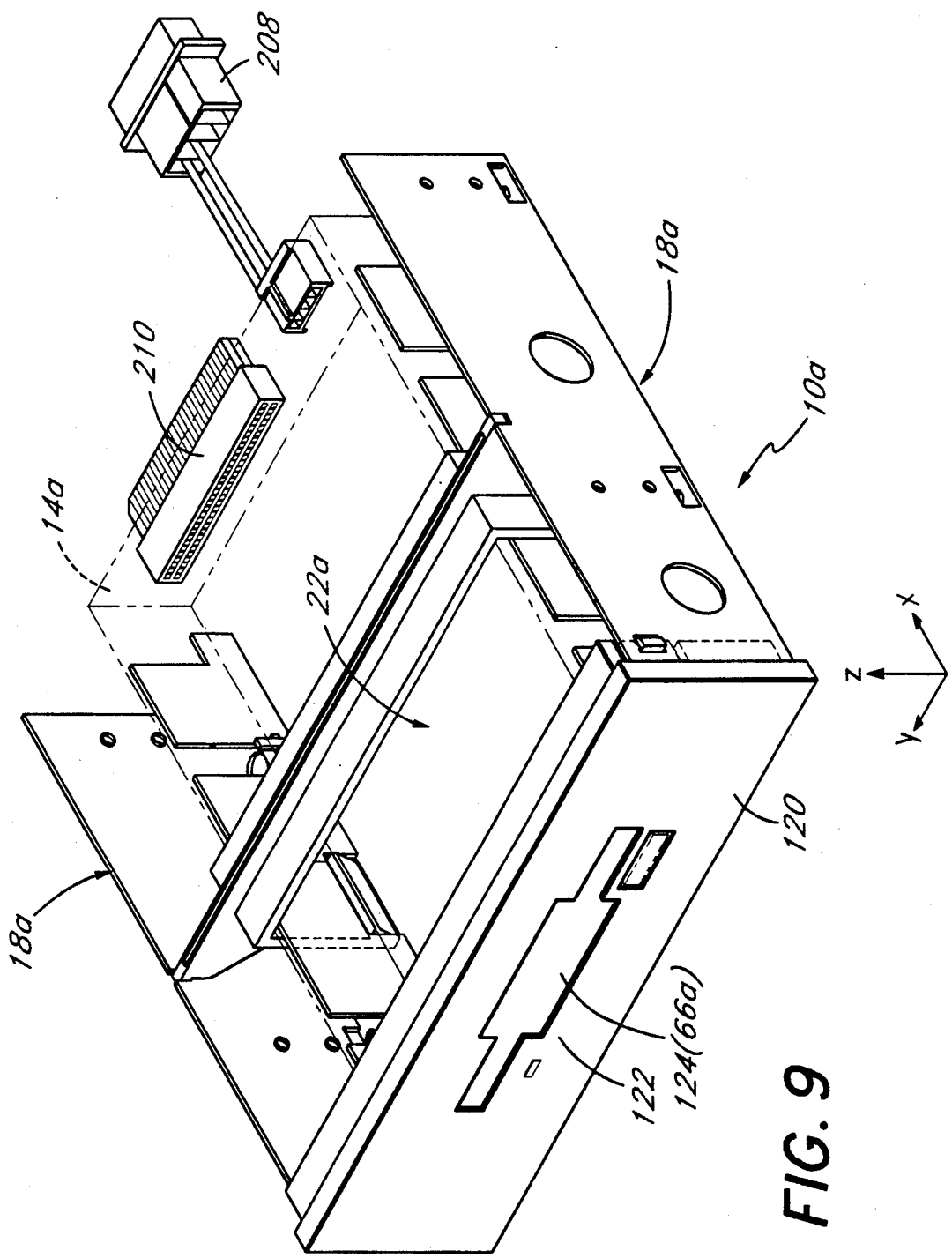
FIG. 9 is a perspective assembly view of a form factor adaptor in accordance with an another preferred embodiment of the present invention.

FIG. 9 illustrates a form factor adaptor 10a in accordance with another preferred embodiment of the present invention. Where appropriate, like numbers with an "a" suffix have been used to indicate like parts of the two embodiments for ease of understanding. The form factor adaptor 10a comprises a pair of brackets 18a and a central clip 22a in accordance with the previous description. The form factor adaptor 10a also includes a dedicated face plate 120 configured according to a disk drive manufacturer's specification regarding the appearance of the face plate. The face plate 120 defines a central aperture 122 exposing the shutter door 66a of the disk drive 14a. The dedicated face plate 120 attaches to the brackets 18a, as previously described, and snaps together with the housing of the disk drive 14a after removing the smaller original front plate 64a from the disk drive 14a. The face plate 120 may alternatively include the shutter door 124 positioned in front of a media opening of the disk drive 14a.

In accordance with another aspect of the present invention, there is provided a kit 200, as illustrated in FIG. 1, comprising the form factor adaptor 10 as previously described and a pin header to card edge electrical connector 210. The kit is used to retrofit the disk drive bay 12 (e.g., 5¼ inch form factor) with a smaller floppy disk drive 14 (e.g., a 3½ inch form factor). The kit 200 additionally comprises a DC power supply cable 208 to connect an interior power supply within the enclosure 16 with the disk drive 14.

Figure 10:
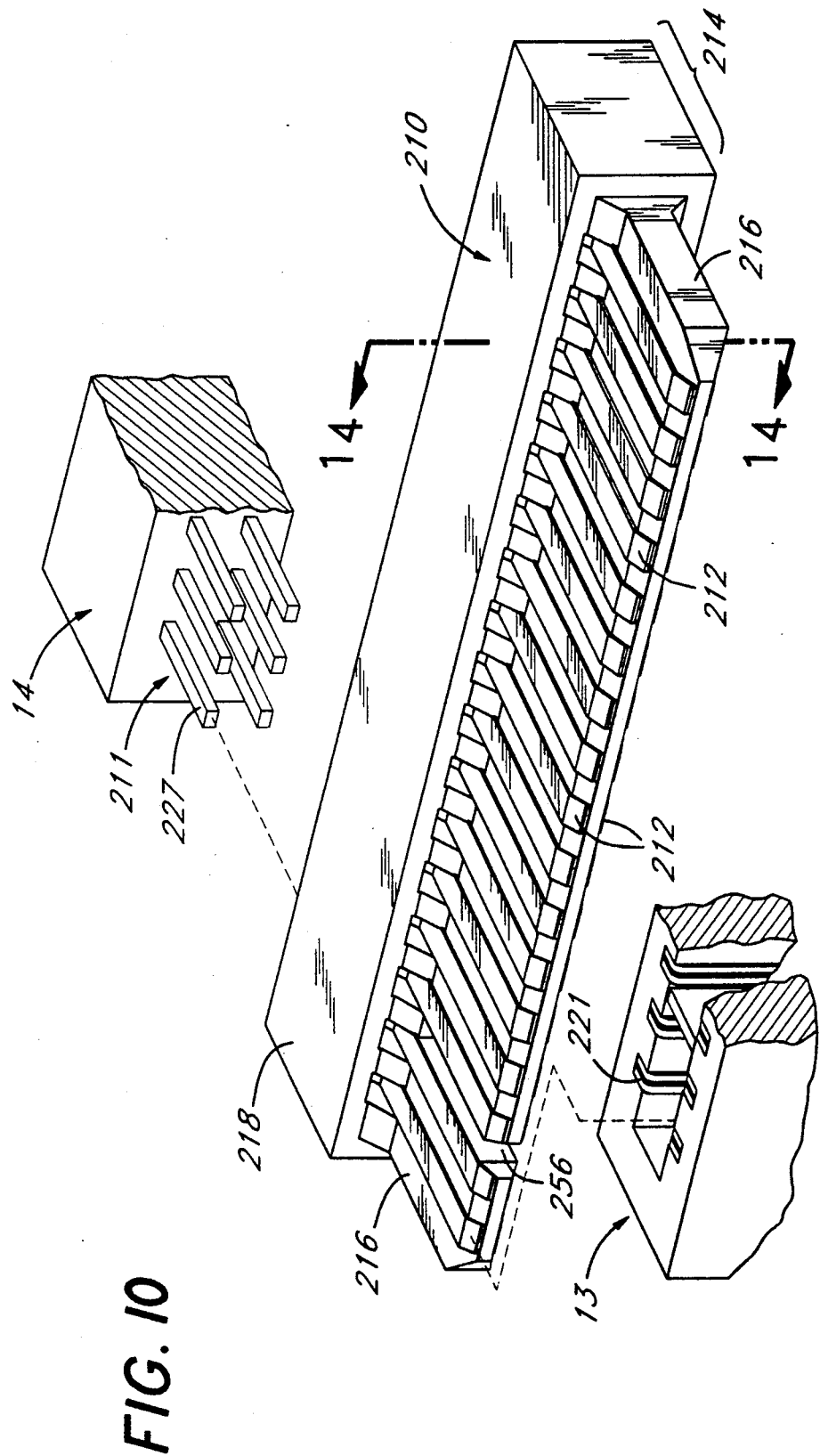
FIG. 10 is a perspective view of an electrical connector in accordance with the present invention.

Referring to FIG. 10, the electrical connector 210 joins together a pin header 211 of a disk drive data port and an existing card edge receptacle 213 of the disk drive bay 12. No electrical interfaces (i.e., material-to-material interconnections) exist within the body of the electrical connector 210, thus improving the reliability of the electrical connector 210.

The electrical connector 210 comprises an integrally formed housing 214 and a series of contacts 212 having unitary bodies. The housing 214 encases the series of contacts 212 which are held in the housing 214 by an interference fit. As illustrated in FIG. 10, the contacts 212 extend from a housing card edge 216 into a housing socket header 218. The components of the electrical connector 210 will now be described in detail.

Referring to FIG. 11, the contact 212 has a unitary body. That is, the contact 212 has no electrical interfaces across its body, such as solder junctions, junctions via an insulator displacement connectors, or other interconnections between circuitry sub-parts.

The contact 212 includes a parallelepiped edge connector 220 extending along a longitudinal axis of the contact 212 and configured to mate with a standard contact pad 221 of the existing card edge receptacle 213. The edge connector 220 has a uniform thickness (measured in the Z-direction) and a uniform width (measured in the Y-direction) along its length (measured in the X-direction). In a preferred embodiment, the edge connector 220 has a width equalling about 1.4 millimeters (mm) and a thickness equalling about 0.4 mm.

An end 222 of the edge connector 220 bends away from the longitudinal axis by an angle ranging between 5° and 60°, and in a preferred embodiment by an angle equal to about 15°. Assembled with the housing 214, as illustrated in FIG. 10, the end 222 of each edge connector 220 bends towards the housing card edge 216 to form a tapered edge easing insertion of the card edge 216 into the card edge receptacle 213 of the disk drive bay 12.

Referring to FIG. 11, the contact 212 additionally includes a forked connector 224 which is positioned at an end of the contact 212 opposite the edge connector 220. The forked connector 224 has two identically-shaped prongs 226 symmetrically positioned about the longitudinal axis of the contact 212. The forked connector 224 provides an electrical interface between the contact 212 and a pin 227 of the data port pin header 211.

Proximate to the free ends 228 of the prongs 226, the prongs 226 are spaced apart by a distance Y smaller than the diameter of the pin header pin 227 so that the prongs 226 will bend outwardly when the pin 227 is inserted between the prongs 226 to produce an interference fit between the forked connector 224 and the pin 227. Advantageously, the distance Y is sufficiently small to cause the prongs to bend in the Y-direction by an amount sufficient to produce a spring force to hold the pin 227 between the prongs 226 and to maintain electrical contact. The prongs 226 of the forked connector 224 are angled from the longitudinal axis to increase the distance between the prongs 226 measured in the Y-direction towards the fixed ends 230 of the prongs 226. Consequently, the amount of displacement of the prongs 226 with the pin 227 inserted is less proximate to the fixed ends 230 than proximate to the free ends 228 such that the entire pin 227 will insert between the prongs 226. Advantageously, the free ends 228 of the prongs 226 include chamfers 231 to ease the insertion of the pin header pin 227 between the prongs 226.

In a preferred embodiment, the forked connector 224 tapers from about a 2.08 mm width proximate to the prong fixed ends 230 to a width of about 1.1 mm proximate to the prong free ends 226. The forked connector 224 has a thickness (measured in the Z-direction) equal to about 0.4 mm, and each prong 226 has a width (measured perpendicularly to a center-line of the prong 226) equal to about 0.55 mm.

The contact 212 further includes a flared central portion 232 located between the edge connector 220 and the forked connector 224 and sized in the Y-direction to interfere with the socket header 218, as discussed below. In a preferred embodiment, the flared central portion 232 has a width equal to about 2.08 mm.

A bend 234 is included between the parallelepiped edge connector 220 and the flared central portion 232 to account for industry standards for the edge card thickness and the row spacing of pin header 211, as will be discussed in detail below. The bend 234 preferably is angled from the longitudinal axis of the contact 212 by about 45°.

The contact 212 is desirably stamped out of a sheet of phosphor bronze and is coated with a nickel finish. The contact can also include a gold flash over the nickel finish to improve its electrical conductivity.

Figure 13:
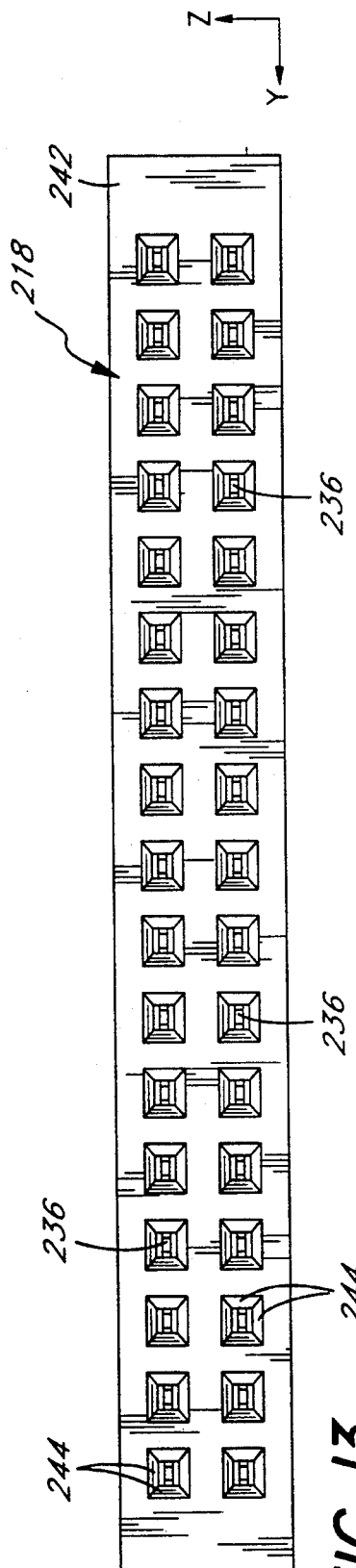
FIG. 13 is a rear elevational view of the electrical connector of FIG. 10.
Figure 14:
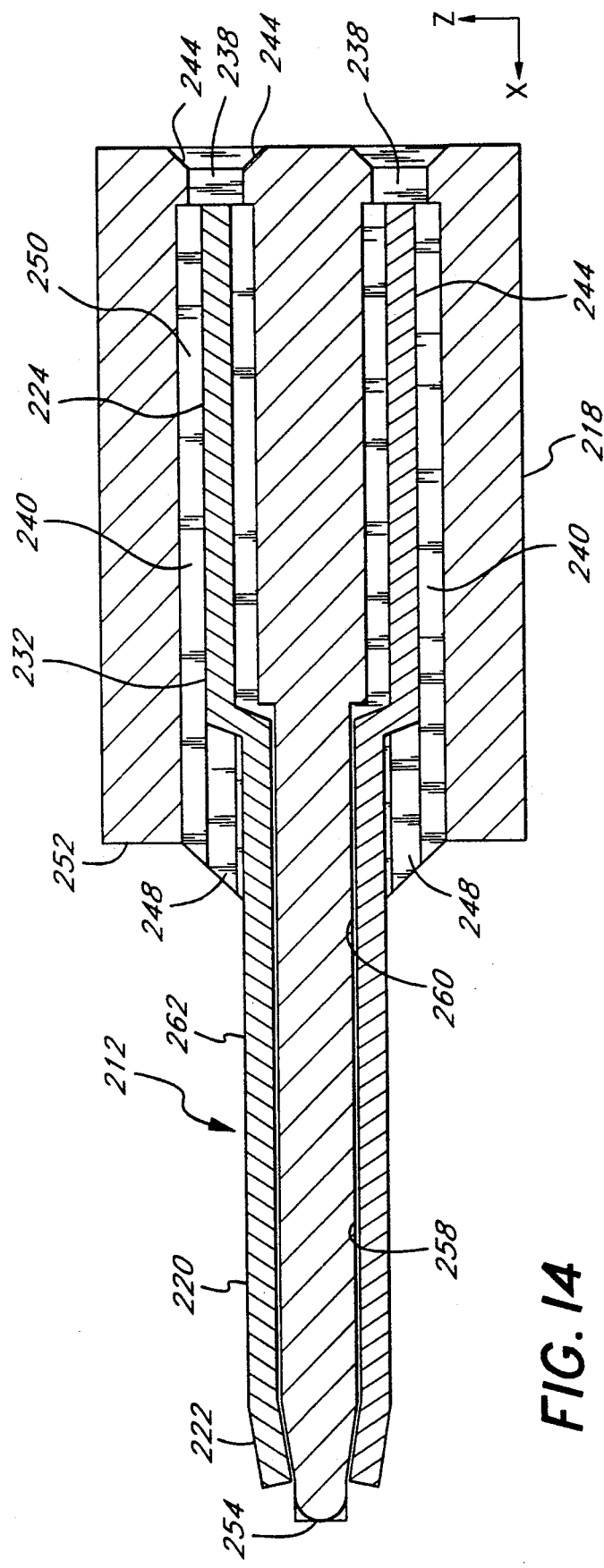
FIG. 14 is a cross-sectional view of the electrical connector taken along line 14—14 of FIG. 10.

Referring to FIGS. 12 through 14, the housing 214 comprises the socket header 218 and the card edge 216. Advantageously, the housing 214 is integrally formed from an insulator thermal plastic, such as a Polybutylene Terephthalate (PBT) with 30% glass fibre reinforced (UL 94V0), through an injection molding process.

As best illustrated in FIG. 13, the socket header 214 defines a plurality of box receptacles 236 aligned in series in two parallel rows and configured to receive the pins 227 of the data port pin header 211. In the series, the box receptacles 236 are equidistantly spaced from one another according to industry standards for pin header pin spacing.

Referring to FIG. 12, each box receptacle 236 comprises a inlet aperture 238 and a contact cavity 240. The inlet aperture 238, as illustrated in FIG. 13, generally has a square funnel-like shape, tapering down in size in a direction into the socket header 218. That is, the inlet aperture 238 has a square shape on an abutment surface 242 of the socket header 218. Four chamfer surfaces 244 extend from the abutment surface 242 in the distal direction for a distance to form a smaller square shape. As used herein, "distal" and "proximal" refer to the proximity of the abutment surface 242. Extending in the distal direction from the smaller square shape, the inlet aperture 238 has a uniform square shape of a size of the smaller square shape. The inlet aperture opens into the contact cavity 240 in the distal direction. In a preferred embodiment, the inlet aperture 238 has a width (measured in the Y-direction) and a height (measured in the Z-direction) equal to about 1.61 mm and tapers down to about 0.96 mm at the smaller square shape. The inlet apertures 238 are spaced 2.54 mm apart from one another in each row and the rows are placed 2.54 mm apart.

The contact cavity 240 has a generally square shape across an area measured perpendicular to a longitudinal axis of the contact cavity 240 and has a generally uniform square shape along its length. As illustrated in FIG. 12, the contact cavity 240 includes a step 246 proximate to a distal end of the socket header 218. The contact cavity 240 additionally includes a pair of diametrically opposed grooves 248 extending into and along a pair of oppositely facing side walls 250. The grooves 248 receive the peripheral edges of the contact flared central portion 232 in assembly, as will be discussed in detail below. As illustrated in FIG. 14, the grooves 248 are centered along the side walls 250 to position the contact forked connector 224 in the center of the box receptacle 236. The distance $D_1$ between the grooves 248 (measured in the Y-direction as seen in FIG. 12) is preferably less that the width (measured in the Y-direction as seen in FIG. 11) of the flared central portion 232.

In a preferred embodiment, the socket header 218 has a length (measured in the X-direction) equal to about 8.9 mm, a width (measured in the Y-direction) equal to about 47.6 mm and a height (measured in the Z-direction) equal to about 5.8 mm.

Referring to FIG. 12, the card edge 216 of the housing 214 has a rectangular shape in plan view sized to industry standards. The card edge 216 has a thickness similarly sized to industry standards so as to fit within and interface with a standard card edge receptacle 213. In a preferred embodiment for use with a 34-contact connector, the card edge 216 has a width of 45.59 mm (measured in the Y-direction), a length of 10.16 mm (measured in the X-direction), and a thickness of 0.8 mm (measured in the Z-direction).

The card edge 216 extends in a cantilever fashion from a distal edge 252 of the socket header 218 at a positioned between the rows of contact cavities 240. At its distal end, as illustrated in FIG. 14, the card edge 216 includes a reduced thickness leading edge 254 which receives the bent ends 222 of the contact edge connectors 220 in assembly. In a preferred embodiment, the leading edge 254 has a thickness equal to about 0.6 mm. Referring to FIG. 12, the card edge 216 also includes a standard key slot 256 which indexes the card edge 216 with the card edge receptacle 213, as known in the art.

The card edge 216 defines a series of channels 258 extending in the X-direction and being positioned on the two planar sides of the card edge 216. Each channel 258 is positioned such that its longitudinal axis lies coplanar with the longitudinal axis of the contact cavity 240 in the X-direction and its bottom surface is coplanar with a bottom surface 260 of the contact cavity 240 on the distal side of the contact cavity step 246. Each channel 258 has a width slightly larger than the width of the contact 212 and has a depth slightly less than the thickness of the contact 212. The surface defined by the bottom surface of the channel 258 and the contact cavity bottom surface 260 distal of the step 246 has a length (measured in the X-direction) generally equal to the length of the contact edge connector 220.

The channels 258 are positioned side by side and are spaced apart from one another by a distance set by industry standards. The industry standards correspond to the spacing between contact pads 221 in a standard card edge receptacle 213. In a preferred embodiment, the channel spacing equals 2.54 mm.

Figure 15:
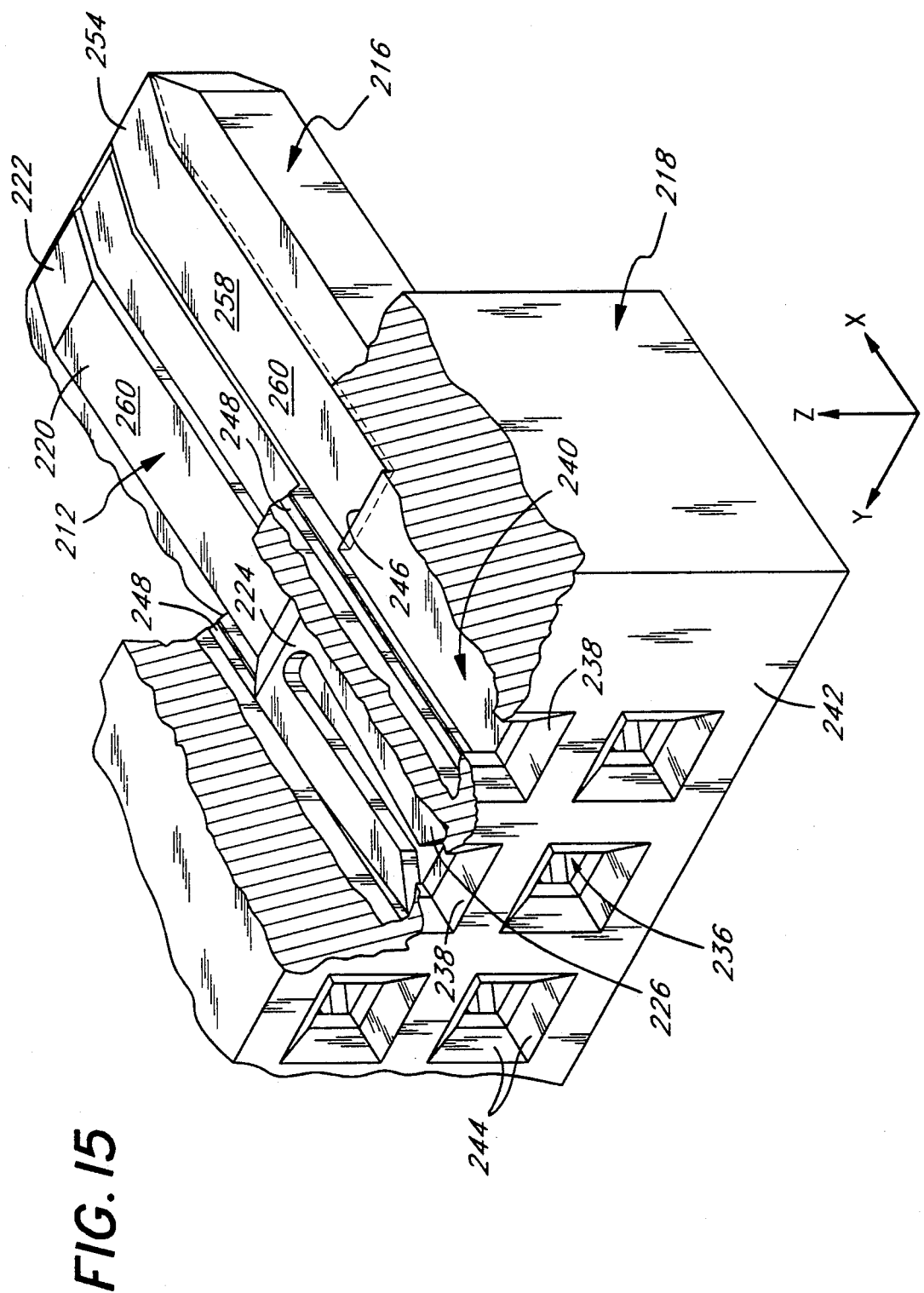
FIG. 15 is a partial cut-away rear perspective view of the electrical connector of FIG. 10.

Referring to FIG. 15, the contacts 212 snugly nest within the channels 258 and box receptacles 236 of the housing 214. Each contact 212 extends from the card edge 216 to the socket header 218, with its forked connector 224 extending into the contact cavity 240 of the socket header 218. Each contact edge connector 220 sits within a channel 258 and extends in the Z-direction above the channel 258 so as to expose a contact surface 262 which interfaces with a contact pad 221 of card edge receptacle 213.

The distal end 222 of the contact 212 nests in the fillet formed by the leading edge 254. As a result, the card edge 216 has chamfered edges which facilitate the insertion of the card edge 216 into the card edge receptacle 213.

As best seen from FIG. 14, the contact bend 234 accounts for the dimensional differences between the pin spacing of the pin header 211 and the contact pad 221 spacing of the card edge receptacle 213. That is, the spacing between opposing contact edge connectors 220 differs from the spacing between the box receptacles 236 due to industry standards. The contact bend 234 forms a transition between the contact edge connector 220 and the contact forked connector 224 which is positioned at the center of the receptacle box 236. The contact bend 238 is perfectly positioned proximate to the step 246 of the contact cavity 240.

As illustrated in FIG. 15, the flared central portion 232 of the contact 212 snugly fit within the grooves 248 of the contact cavity 240. The resulting interference fit between the flared central portion 232 and the socket header 218 secures the contact 212 in place.

The contact forked connector 224 is positioned within the contact cavity 240 generally laying along the longitudinal axis of the receptacle box 236. As best seen in FIG. 12, the cavity 240 has a width (measured in the Y-direction) significantly larger than the width of the forked connector 224 at its proximal end to provide a space for prong 226 deflection occurring when a pin 227 of the pin header 211 is inserted into the box receptacle 236. In a preferred embodiment, the contact cavity 240, including the grooves 258, has a width of 1.96 mm and the distal end of the contact forked connector 224 has a width of 1.4 mm.

In use, the pins 227 of the pin header 211 insert into the box receptacles 236 with the pins 227 snugly fitting in between the prongs 226 of the contact forked connectors 224. The prongs 226 which normally angle inwardly, spread apart as the pin 227 is inserted. With the pin 227 removed, the prongs 226 return to their normal inwardly angled position. Advantageously, the prongs 226 are constructed of a resilient material and the prongs 226 only elastically deflect.

With the electrical connector 210 connected to the pin header 211 of the disk drive data port, the card edge 216 of the housing 214 is inserted into the existing card edge receptacle 213 of the disk drive bay 12. Preferably, the card edge 216 has a thickness slightly greater than the receptacle opening dimension to produce a interference fit between the components.

Assembled accordingly, electrical data signals pass across the electrical connector 210 through the unitary bodies of the contacts 212. The electrical connector 210 does not include any material-to-material interconnections of electrical components, thereby reducing the possibility of an opening occurring in or a short occurring between the circuitry of the electrical connector 210. Additionally, the electrical connector 210 has a minimal size, thus conserving space within the cabinet enclosure 16 of the personal computer.

When manufacturing the electrical connector 210, the contacts 212 are stamped in rows and left attached to a piece of margin material. After the desired plating procedures, a row of contacts 212 is inserted into the housing 214 and each contact 212 is press-fit into the socket header 218. Once in place, the contacts 212 are separated from the margin material 264 by known in the art.

Because the assembly involves relatively few parts, the ease of manufacturing and cost savings are apparent. In addition, the small number of parts also contributes to the desirability of the invention because of the increased reliability of the electrical connector 210.

Modifications and variations of the embodiments described above may be made by those skilled in the art while remaining within the true scope and spirit of this invention. For example, the clip of the form factor adaptor 10 can have an X-shape, stretching across the disk drive 14, or the form factor adaptor 10 can comprise a plurality of clips securing the disk drive 14 in place.

In addition, the frame, preferably formed between the pair of brackets described above, could have a unitary construction. For instance, it is contemplated that the frame could support a disk drive on a central pedestal with a clip securing the disk drive in place. The frame could also comprise a sled for mounting in disk drive bays adapted to receive such a sled.

Therefore, although this invention has been described in terms of certain preferred embodiments, other embodiments that will be apparent to those of ordinary skill in the art are also within the scope of this invention. Accordingly, the scope of the invention is intended to be defined only by the claims which follow.

What is claimed is:

1. A form factor adaptor for installing an electrical component into a larger enclosure bay, said adaptor comprising:
    a chassis to support the electrical component, said chassis having a pair of rails spaced apart to receive the electrical component, said chassis further comprising a faceplate adapted to be located at the exterior of the enclosure bay; and
    a clip comprising a pair of spring clasps interengaging with said chassis to secure the electrical component to the chassis.

2. The adaptor of claim 1, wherein said chassis comprises two brackets, each bracket comprising one of said rails.

3. The adaptor of claim 1, wherein said clip spans across said rails.

4. The adaptor of claim 1, wherein said clip comprises a pair of legs and a cross member, each of said spring clasps being formed by one of said leg and a tang positioned at a bottom end of said leg.

5. The adaptor of claim 4, wherein the bottom end of each leg of said clip angles inwardly towards an opposing leg.

6. The adaptor of claim 5, wherein said legs angle inwardly by about 3° from a perpendicular axis.

7. The adaptor of claim 4, wherein said cross member has a convex shape extending away from said legs.

8. The adaptor of claim 1, wherein said faceplate defines an aperture sized to receive a data storage medium.

9. A foam factor adaptor for installing a data storage device into an enclosure bay having a form factor larger than the data storage device, said adaptor comprising:
a chassis comprising:
a pair of brackets, each bracket having an interior rail and an exterior rail, said brackets defining a space between said interior rails sufficient to receive the data storage device, said brackets further defining a space by said exterior rails generally equal to the enclosure bay form factor; and
a face plate interconnecting with one set of ends of said brackets; and
a clip having a broad U-shaped defined between a pair of legs and a cross member, said cross member spanning across said interior rails of said brackets and each leg of said clip extending between said interior rail and said exterior rail, each of said legs additionally comprising a spring clasp interengaging with one of said brackets to secure said clip to said brackets.

10. The form factor adaptor of claim 9, wherein said brackets additionally comprise protuberances extending from said interior rails, said protuberances configured to engage the data storage device and positioned to index the data storage device with respect to said face plate.

11. The form factor adaptor of claim 9, wherein said cross member contacts the side edges of the data storage system when assembled.

12. The form factor adaptor of claim 9, wherein said clip additionally comprises a support tab and said bracket additionally comprises a notch receiving said support tab to stabilize said clip in the X-direction.

13. An installation kit for installing an electrical component into an enclosure bay having a form factor larger than the electrical component, said kit comprising:
a chassis configured to support the electrical component and to connect with the enclosure bay structure, said chassis further comprising a face plate adapted to be located at exterior of the enclosure bay; and
a clip which interengages said chassis to secure the electrical component to said chassis, said clip having at least one cross member spanning across said chassis and attached thereto to prevent the electrical component from moving in a Z-direction which is generally perpendicular to an X-Y plane defined by said chassis.

14. The installation kit of claim 13, additionally comprising an electrical connector for connecting a pin header to a card receptacle.

15. The installation kit of claim 14, wherein said electrical connector comprises:
a plurality of contacts, each contact comprising a unitary body having a generally parallelepiped edge connector configured to contact a similar shaped contact pad of said card receptacle and a forked connector configured to contact a pin of said pin header, said contact further comprising a flared central portion positioned between said contact end and said forked end; and
an integrally formed housing comprising a card edge and a socket header, said socket header defining a series of box receptacles extending through said socket header and being configured to receive said pins of said pin header, each box receptacle defining a longitudinal axis and comprising a groove extending parallel to said longitudinal axis which frictionally receives said flared portion of said contact with said forked connector being positioned within said box receptacle, said card edge extending generally parallel to the longitudinal axes of said box receptacles and defining a series of channels receiving said contact edge connectors extending from said box receptacles.

16. The installation kit of claim 13, wherein said clip comprises a cross member and a spring clasp, said spring clasp interengaging with said chassis to hold said cross member against the electrical component positioned on said chassis.

17. The installation kit of claim 16, wherein said cross member has a convex shape.

18. An installation kit for installing an electrical component into an enclosure bay having a form factor larger than the electrical component, said kit comprising:
a chassis configured to support the electrical component and to connect wit the enclosure bay structure, said chassis comprising a pair of brackets, each bracket having an interior rail and an exterior rail, said brackets defining a space between said interior rails sufficient to receive the electrical component, said brackets further defining a space by said exterior rails generally equal to the enclosure bay form factor, said chassis further comprising a face plate interconnecting with one set of ends of said brackets; and
a clip which interengages with said chassis to secure the electrical component to said chassis, said clip having at least one cross member spanning across said chassis and attached thereto to prevent the electrical component from moving in a Z-direction which is generally perpendicular to an X-Y plane defined by said chassis.

19. The installation kit of claim 18, wherein said face plate defines an aperture configured to expose a front panel of said electrical component with the electrical component positioned between said brackets.

20. The installation kit of claim 18, wherein said face plate defines a media opening.

21. The installation kit of claim 18, wherein said face plate comprises a guide tab.

22. The installation kit of claim 18, wherein said face plate comprises a bevelled rear surface.

23. A method of installing a data storage device into a larger enclosure bay, said method comprising the steps of:
supporting said data storage device with a chassis having a face plate;
snapping together a clip and said chassis to secure the data storage device to said chassis; and
mounting said chassis to an internal structure of said enclosure bay.

24. The method of claim 23, wherein said step of supporting the data storage device comprises the steps of:

forming a chassis with a pair of brackets and said faceplate;

snapping said brackets to said face plate to form an internal space configured to receive the data storage device;

inserting the data storage device into said internal space;

supporting the data storage device within said internal space; and indexing the data storage device within said internal space with respect to said face plate.

25. The method of claim 24, wherein said step of supporting and indexing the data storage device within said internal space comprises the steps of:

providing a plurality of protuberances extending from said brackets into said internal space;

engaging said protuberances with the data storage device by inserting said protuberances into standard apertures of the data storage device; and positioning said protuberances from said face plate to index the data storage device with respect to said face plate such that a front end of said data storage device juxtaposes said face plate.

* * * * *